United States Patent [19]

Rafaely

[11] 4,237,931
[45] Dec. 9, 1980

[54] THREE-WAY VALVE

[75] Inventor: Gilad Rafaely, Givat Chaim - Ihud, Israel

[73] Assignee: Givat Chaim-Ihud, Hakvutzot Vehakibbutzim Kvutzat Poalim Lehityashvut Shitufit B.M., Kibbutz Givat Chaim-Ihud, Israel

[21] Appl. No.: 6,247

[22] Filed: Jan. 24, 1979

[30] Foreign Application Priority Data

Jan. 30, 1978 [IL] Israel .................................. 53914

[51] Int. Cl.³ .................. F16K 31/128; F16K 11/02
[52] U.S. Cl. ..................... 137/625.5; 137/625.27; 137/625.66
[58] Field of Search ............ 137/625.66, 625.5, 625.27

[56] References Cited

U.S. PATENT DOCUMENTS

| 3,202,170 | 8/1965 | Holbrook | 251/367 X |
| 3,592,227 | 7/1971 | Rivolier | 137/625.66 X |

FOREIGN PATENT DOCUMENTS

| 1917597 | 10/1970 | Fed. Rep. of Germany | 137/625.27 |
| 1195213 | 5/1959 | France | 137/625.5 |

*Primary Examiner*—Arnold Rosenthal
*Attorney, Agent, or Firm*—Benjamin J. Barish

[57] ABSTRACT

A three-way control valve is described comprising a body member formed with a central axial bore receiving a valve assembly axially displaceable within the bore and including a first valve member adapted to close one end of the bore in one position of the valve assembly, and a second valve member adapted to close the opposite end of the bore in a second position of the valve assembly, to establish selective communication between three ports formed in the body member. The valve assembly is biassed in one position by a spring, and is actuated to its other position by fluid pressure. One application for such a control valve is in a cow milking machine wherein one port is connected to the cow milking cups, the second port is connected to a source of vacuum applied to the milking cups, and the third port is connected to a source of water for washing the milking cups.

5 Claims, 3 Drawing Figures

THREE-WAY VALVE

BACKGROUND OF THE INVENTION

The present invention relates to valves, and particularly to three-way valves including three ports, the valve being controlled so as to selectively establish communication from one port either to the second or to the third port.

SUMMARY OF THE INVENTION

According to a broad aspect of the present invention, there is provided a three-way control valve characterized in that it includes a body member formed with an axial bore extending through its opposite faces, and a peripheral wall circumscribing and extending axially beyond said opposite faces; a pair of end walls secured to the opposite ends of the peripheral wall and spaced thereby from said opposite faces to define therewith a first and a second space; and a valve assembly displaceable between two positions and including a first valve member disposed in said second space, a second valve member disposed in said second space, and a connecting stem passing through said axial bore and carrying at its opposite ends the two valve members such that in one position of the valve assembly the first valve member opens the end of the axial bore in one face of the body member and the second valve member closes the end of the axial bore in the opposed face thereof, and in the other position of the valve assembly the first valve member closes the end of the axial bore in said one face of the body member and the second valve member opens the end of the axial bore in said opposed face thereof. The first and second valve members include first and second flexible diaphragms fixed at their outer peripheries between the peripheral and end walls and are secured at the centers to the connecting stem of the valve assembly. The body member is further formed with a first port, a second port, a third port, a first passageway connecting the first port directly to said axial bore, a second passageway connecting the second port to said axial bore via said first space and the end of the axial bore in said one face of the body member, and a third passageway connecting the third port to said axial bore via said second space and the end of the axial bore in said opposed face of the body member. The above-mentioned first, second and third ports are formed along radially-extending angularly spaced axes through the peripheral wall of the body member. The first passageway comprises a radial bore extending continuously from the first bore to the axial bore; the second passageway comprises a recess formed in one face of the body member at a first angular location thereof and extends axially from the second bore into the space defined by its respective end wall; and the third passageway comprises another recess formed in the opposite face of the body member, at a second angular location thereof angularly spaced from the first-mentioned recess and extending axially from the third bore into the space defined by its respective end wall.

The valve further includes displacing means for selectively displacing said valve assembly either to said one position wherein said valve assembly establishes communication between said first and second ports, or to said other position wherein said valve assembly establishes communication between said first and third ports. The latter displacing means comprises a spring in the space between one end wall and the first valve member and biassing the latter to close its end of the axial bore and the second valve member to open its end of the axial bore, and a control port for introducing pressurized fluid into the space between the other end wall and the second valve member for displacing the latter to close its end of the axial bore and the first valve member to open its end of the axial bore.

The foregoing features enable three-way control valves to be built of simple, compact and inexpensive construction, and having a high degree of reliability of operation over long periods of use.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
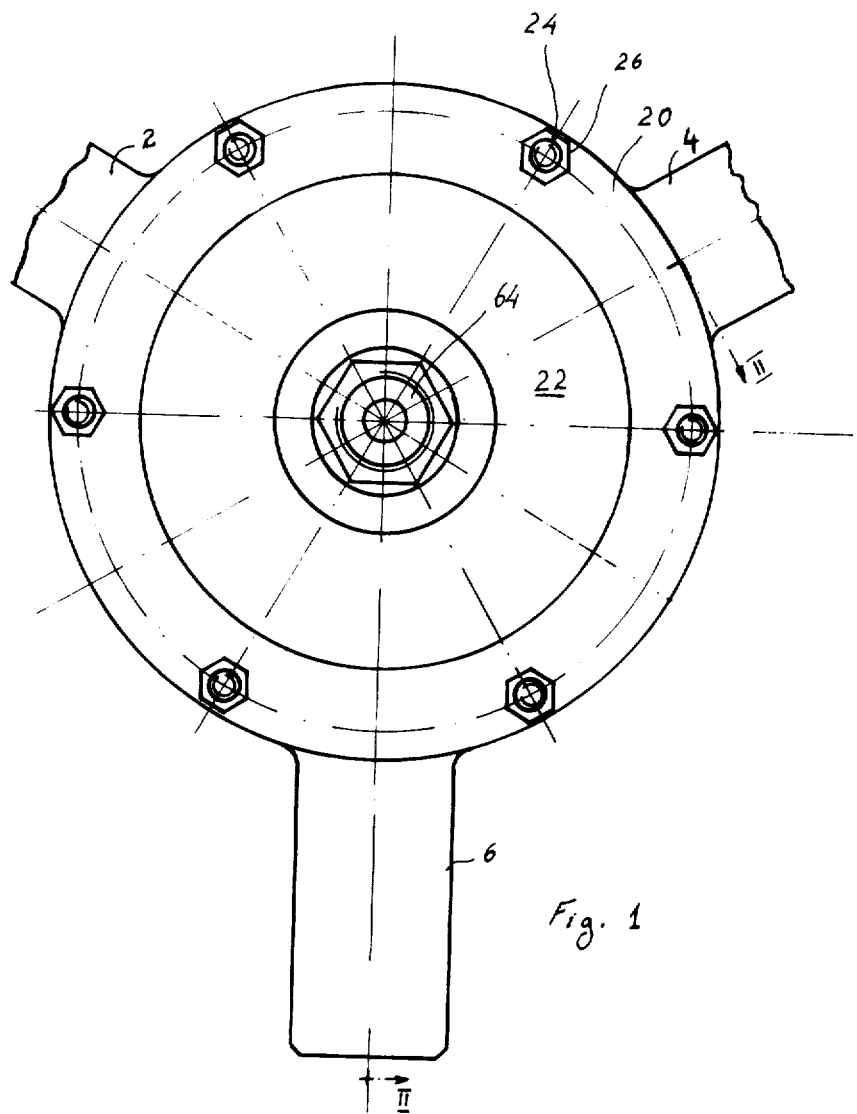
FIG. 1 is an elevational view of one form of three-way control valve constructed in accordance with the invention.

The control valve illustrated in the drawings is adapted to establish communication between a first port connection 2, selectively either to a second port connection 4 or to a third port connection 6. One application for such a control valve is in a milking machine, wherein port connection 2 is connected to the milking cups applied to the cow, port connection 4 is connected to a source of vacuum applied to the milking cups via port connection 2, and port connection 6 is connected to a source of water for applying same to the milking cups via port connection 2 at periodic intervals between milking operations in order to wash the cups.

The control valve comprises a housing including a body member, generally designated 10, of cylindrical configuration and formed with an axial bore 12 centrally through its opposite faces 14, 16. Body member 10 is further formed with an outer peripheral wall 18 circumscribing and extending axially beyond the opposite faces 14, 16. The housing further includes a pair of dished end walls 20, 22 secured along their outer peripheries to the opposite ends of peripheral wall 18 by means of fasteners 24 and nuts 26. The three port connections 2, 4 and 6 are formed along radially-extending, angularly spaced axes through the peripheral wall 18.

The three-way control valve further includes an internal valve assembly, generally designated 28, comprising a first flexible rubber diaphragm 30 disposed in the space between face 14 of body member 10 and end wall 20, a second flexible rubber diaphragm 32 disposed in the space between face 16 and end wall 22, and a rigid connecting stem 34 passing through the axial bore 12 of the body member. The outer periphery of diaphragm 30 is formed with a peripheral rib 35 received within a recess 36 in the end of peripheral wall 18 when assembled between the latter and end wall 20; and diaphragm 32 is similarly formed with a peripheral rib 38 received within a recess 40 in the opposite end of peripheral wall 18 when assembled between it and end wall 22. The opposite ends of the connecting stem 34 terminate in enlarged disc-shaped heads 42, 44 each received in a socket 46, 48 formed centrally of the two diaphragms 30, 32.

Body member 10 is further formed on each of its two faces 14, 16 with a circular rib 50, 52 circumscribing the respective end of axial bore 12. The two circular ribs 50, 52 are in alignment with the outer faces 54, 56 of the diaphragm sockets 46, 48, and also with the enlarged heads 42, 44 of the connecting stem 34.

The connecting stem 34 is made of two sections 58, 60 which are press-fitted and retained together by friction. The two-section stem 34 is of a length greater than the distance between the circular ribs 50, 52, such that when face 54 of diaphragm 30 engages its rib 50, face 56 of the other diaphragm 32 is spaced from its rib 52, as shown in FIG. 2.

The valve assembly 28 is displaceable as a unit to one of two positions: in one position (illustrated in FIG. 2), face 54 of diaphragm 30 engages circular ribs 50 and thereby closes that end of the axial opening 12, while face 56 of diaphragm 32 is spaced from circular rib 52 thereby opening that end of the axial opening; in its second position, face 54 of diaphragm 30 is spaced from circular rib 50 thereby opening that end of the axial opening 12, while face 56 of diaphragm 32 engages circular rib 52 thereby closing that end of the axial opening.

Figure 2:
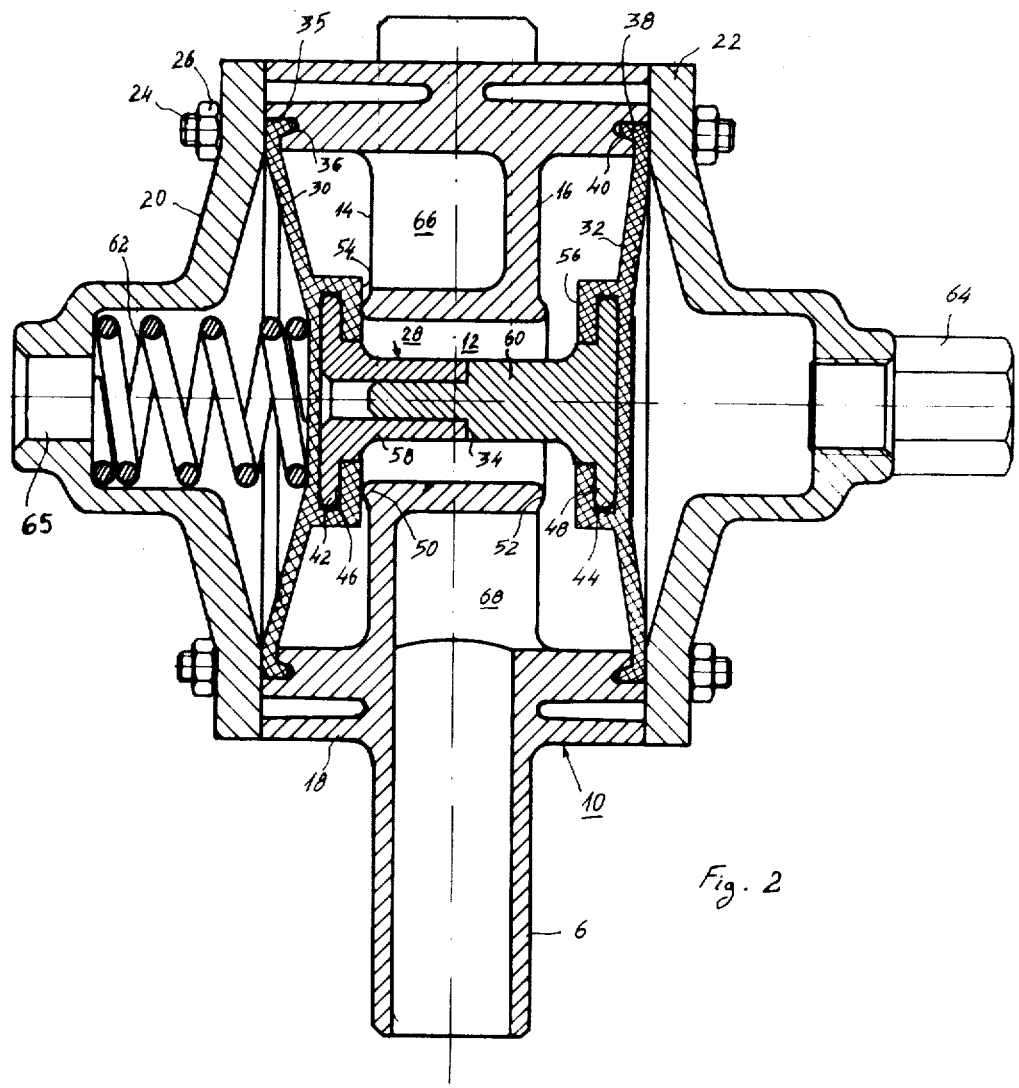
FIG. 2 is a sectional view (partially rotated) along lines II—II of FIG. 1.

A spring 62 interposed between end wall 20 and diaphragm 30 biases the valve assembly 28 to the first-mentioned of the above positions, as illustrated in FIG. 2. For actuating the valve assembly to its second position, the opposite end wall 22 is provided with a control port 64 through which pressurized fluid may be introduced into the space between end wall 22 and diaphragm 32. This pressurized fluid acts against spring 62 to move valve assembly 28 (leftwardly in FIG. 2) to the position wherein face 56 of diaphragm 32 seats against circular rib 52 closing that end of the axial opening 12, whereas face 54 of diaphragm 30 is spaced away from circular rib 50 thereby opening that end of the axial opening. End wall 20 is provided with a central opening 65 for venting purposes.

Figure 3:
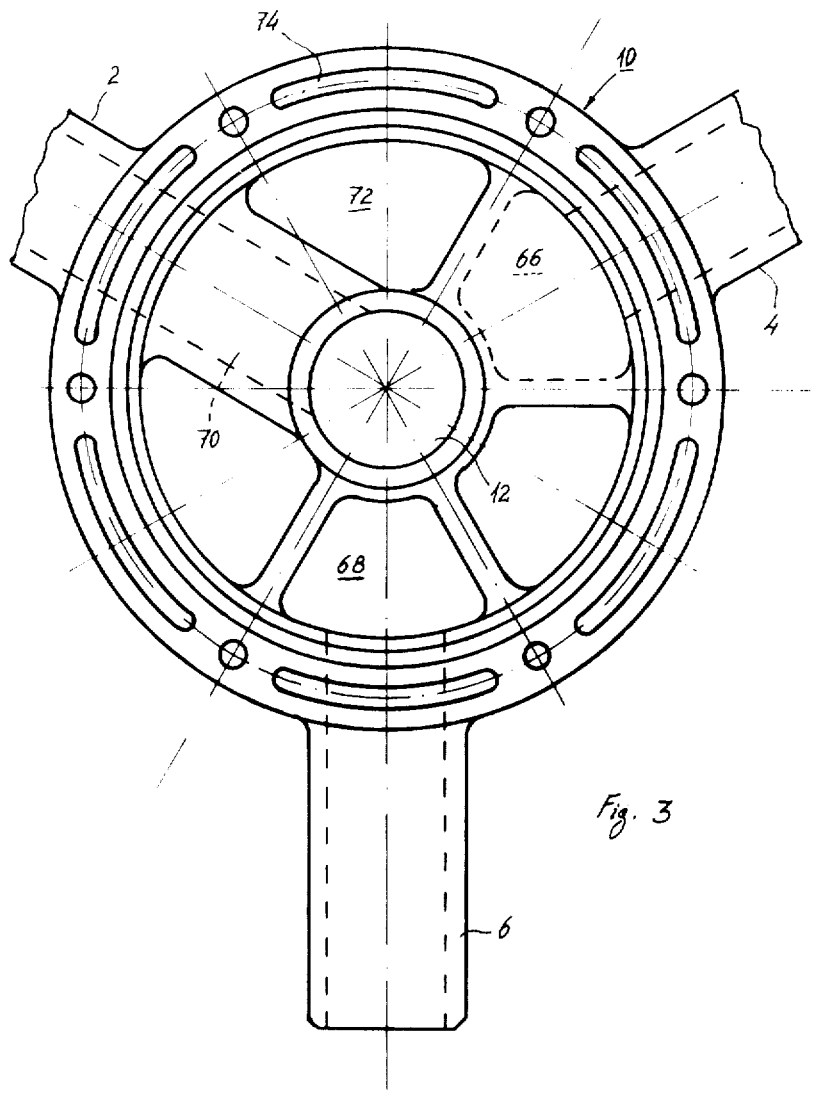
FIG. 3 is an elevational view of the body member in the valve of FIG. 1.

A bore or recess 66 is formed in face 14 of the body member 10 in alignment with and communicating with port connection 4 (see FIG. 3), and a second bore or recess 68 is formed in the opposite face 16 of the body member in alignment with and communicating with port connection 6. Port connection 2 is formed with a continuous bore or passageway 70 extending radially through the body member to and communicating with its axial bore 12. As can be seen from the drawings, recess 26 is formed at a first angular location of body-member face 14 and extends axially from its port connection 4 into the space between face 14 and end wall 20, while recess 68 is formed at a second angular location of body member face 16, angularly spaced from recess 66, and extends axially from its port connection 6 into space between face 16 and end wall 22.

Body member 10 may be produced by injection molding plastic material, and for this purpose, it is preferably formed with additional cavities 72 (FIG. 3) in both its faces 14, 16, and with slots 74 in its peripheral wall 18, for material-saving and shrinkage-reducing purposes.

The three-way control valve illustrated in the drawings operates as follows:

It will be seen that port connection 2 of the valve continuously communicates with axial bore 12 of body member 18 via passageway 70. In the normal condition of the valve, as illustrated in FIG. 2, spring 62 biasses the valve assembly 28 to the position wherein face 54 of diaphragm 30 engages the circular rib 50, thereby closing that end of the axial bore 12; whereas face 56 of diaphragm 32 is spaced from the circular rib 52 on the opposite face of the body member, thereby opening that end of the axial bore. Accordingly, communication from port 2 is established via axial bore 12 and recess 68 to port connection 6.

In order to switch port connection 2 from port connection 6 to port connection 4, pressurized fluid is applied via the control port 64 to the space between diaphragm 32 and end wall 22. This causes diaphragm 32 to be flexed (against spring 62) to bring its face 56 into engagement with circular rib 52, and diaphragm 30 to be flexed to bring its face 54 out of engagement with circular rib 50. Accordingly, the former end (right, FIG. 2) of axial opening 12 is closed, and the latter end (left, FIG. 2) of the axial opening is opened, thereby establishing communication from port connection 2, via axial bore 12 and cavity 66, to port connection 4.

What is claimed is:

1. A three-way control valve characterized in that it includes a body member formed with an axial bore extending through its opposite faces, and with a peripheral wall circumscribing and extending axially beyond said opposite faces; a pair of end walls secured to the opposite ends of the peripheral wall and spaced thereby from said opposite faces to define therewith a first and second space; a valve assembly displaceable between two positions and including a first valve member disposed in said first space, a second valve member disposed in said second space, and a connecting stem passing through said axial bore and carrying at its opposite ends the two valve members such that in one position of the valve assembly the first valve member opens the end of the axial bore in one face of the body member and the second valve member closes the end of the axial bore in the opposed face thereof, and in the other position of the valve assembly the first valve member closes the end of the axial bore in said one face of the body member and the second valve member opens the end of the axial bore in said opposed face thereof; said first and second valve members including first and second flexible diaphragms fixed at their outer peripheries between said peripheral and end walls and secured at their centers to said connecting stem; said body member being further formed with a first port, a second port, a third port, a first passageway connecting the first port directly to said axial bore, a second passageway connecting the second port to said axial bore via said first space and the end of the axial bore in said one face of the body member, and a third passageway connecting the third port to said axial bore via said second space and the end of the axial bore in said opposed face of the body member; said first, second and third ports being formed along radially-extending, angularly spaced axes through the peripheral wall of the body member, said first passageway comprising a radial bore extending continuously from said first port to said axial bore, said second passageway comprising a recess formed in said one face of the body member at a first angular location thereof, and extending axially from said second port into said first space; said third passageway comprising another recess formed in said opposed face of the body member at a second angular location thereof angularly spaced from said first recess and extending axially from said third port into said second space; and displacing means for selectively displacing said valve assembly either to said one position wherein said valve assembly establishes communication between said first and second ports, or to said other position wherein said valve assembly establishes communication between said first and third ports; said displacing means comprising a spring in said first space interposed between said one end wall and said first valve member and biassing the latter to close its end of the axial bore and the second valve member to open its end of the axial bore, and a control port for introducing pressurized fluid into said second space between said second end wall and said second valve member for displacing the latter to close its end of the axial bore and the first valve member to open its end of the axial bore.

2. A control valve according to claim 1, wherein said body member is of cylindrical configuration and said diaphragms are of circular configuration.

3. A control valve according to claim 2, wherein each of said opposite faces of the body member is formed with a circular rib circumscribing the respective end of the axial bore and adapted to be engaged by the respective diaphragm when displaced to close the respective end of the axial bore.

4. A control valve according to claim 3, wherein the ends of said connecting stem are formed with enlarged disc-shaped heads received in sockets formed centrally of the two diaphragms and adapted to overlie the circular ribs formed in the opposite faces of the body member.

5. A control valve according to claim 1, wherein each end of said peripheral wall of the body member is formed with a recess, each of said diaphragms including a peripheral rib receivable in one of said recesses.

* * * * *